United States Patent [19]

Schreiter et al.

[11] Patent Number: 4,998,771

[45] Date of Patent: Mar. 12, 1991

[54] VEHICLE ROOF WITH TWO-PART COVER

[76] Inventors: Thomas Schreiter, Hochmeierstr. 6, 8000 Muenchen 70; Peter Reihl, Gerlichstr. 3, 8000 Muenchen 60; Stefan Miklosi, Fockensteinstr. 27, 8000 Muenchen 90; Burkhard Reinsch, Karwendelstr. 4, 8027 Neuried; Bernhard Wingen, Hohenrainerstr. 3, 8152 Feldkirchen; Werner Pätz, Hittostr. 10, 8050 Freising; Arpad Furst, Geschwister Scholl Ring 35, 8034 Germering, all of Fed. Rep. of Germany

[21] Appl. No.: 554,915

[22] Filed: Jul. 20, 1990

[30] Foreign Application Priority Data

Jul. 21, 1989 [DE] Fed. Rep. of Germany ....... 3924035

[51] Int. Cl.$^5$ .............................................. B60J 7/043
[52] U.S. Cl. ...................... 296/217; 296/219; 296/222; 296/223; 296/224
[58] Field of Search ................ 296/216, 217, 222-224, 296/219

[56] References Cited

U.S. PATENT DOCUMENTS 4,911,496 3/1990 Fuerst ................................ 296/220
4,911,497 3/1990 Schrieter et al. ................... 296/222

FOREIGN PATENT DOCUMENTS 3522781 10/1986 Fed. Rep. of Germany .

Primary Examiner—Dennis H. Pedder
Attorney, Agent, or Firm—Sixbey, Friedman, Leedom & Ferguson

[57] ABSTRACT

A vehicle roof with a two-part cover that has a front and a rear cover part which, in a closed position, together close a roof opening made in a stationary roof skin. The rear cover part can be slid rearward along longitudinal guide mechanisms running on both sides of the roof opening into an open position that at least partially opens the roof opening. The front cover part can be pivoted relative to the rear cover part into a ventilation position. In the ventilation position, the front edge of the front cover part is lowered under the stationary roof skin, forming a ventilation gap lying in the area of the front edge of the roof opening, while the rear edge of the front cover part is kept at least approximately at the height of the front edge of the rear cover part.

20 Claims, 7 Drawing Sheets

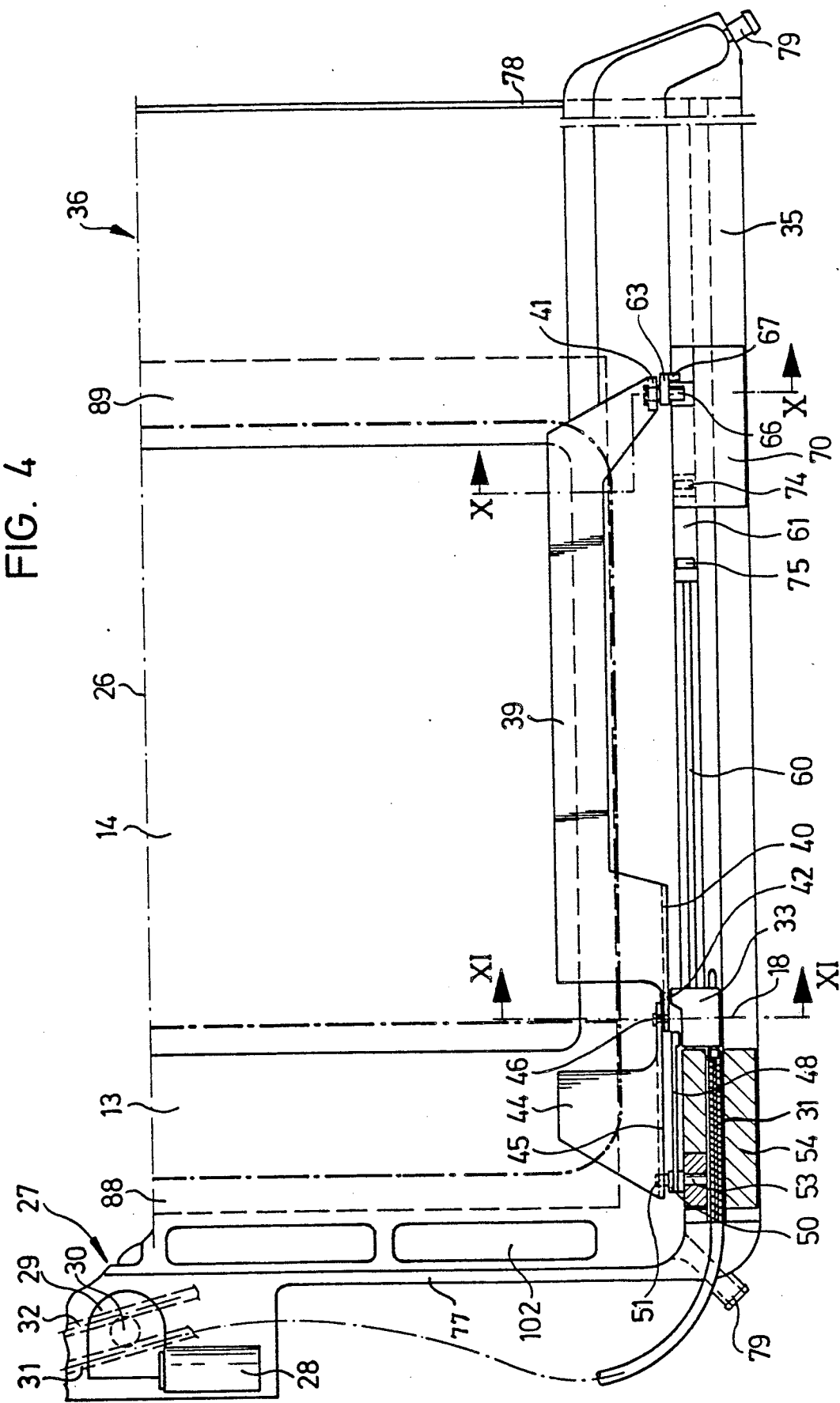

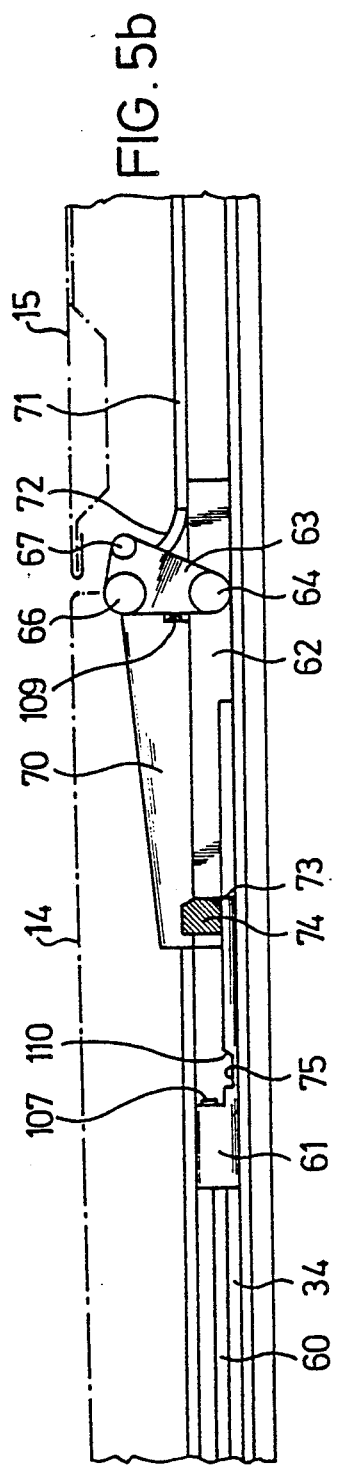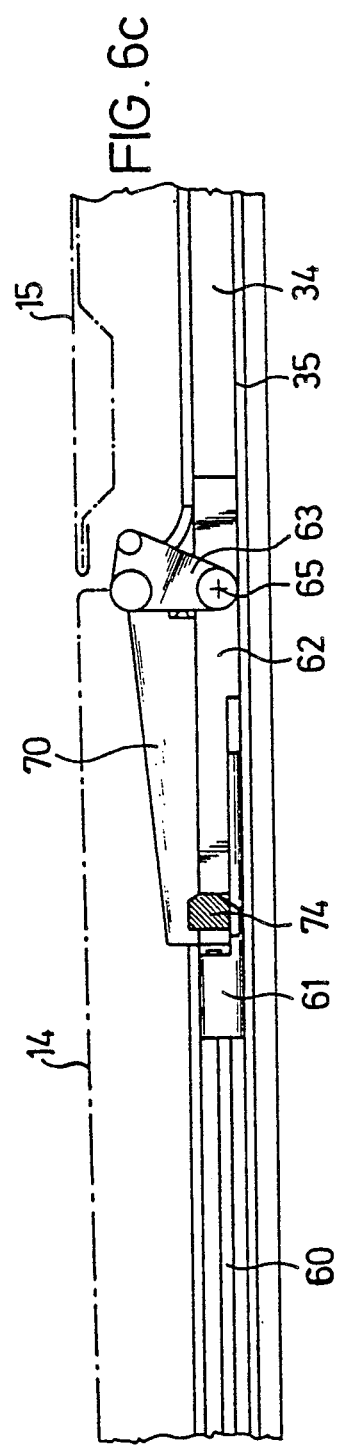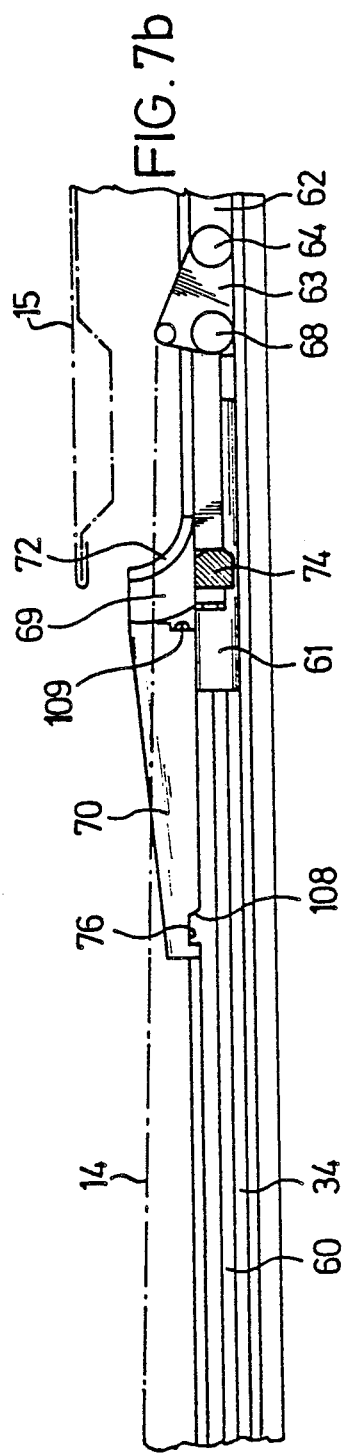

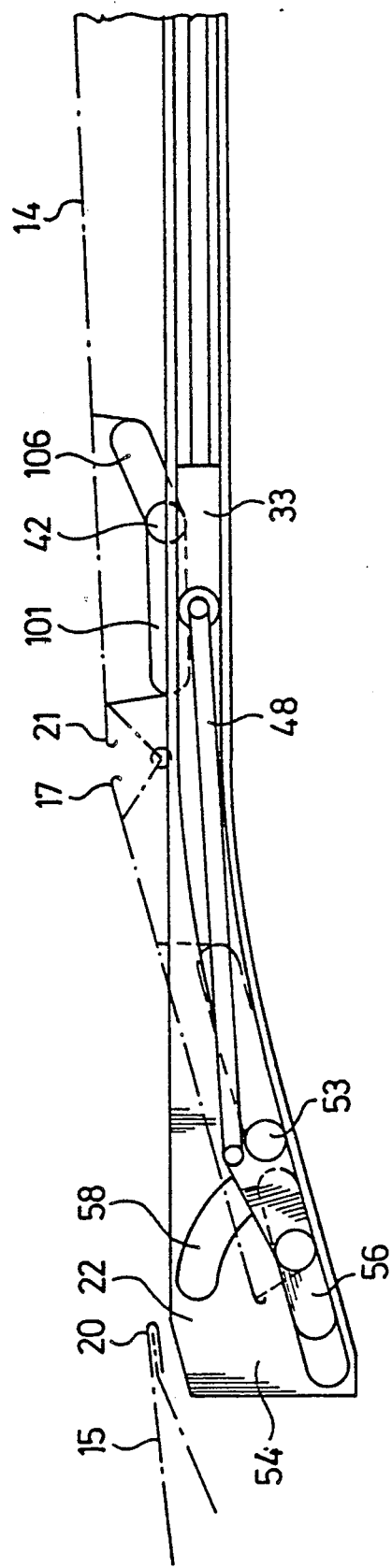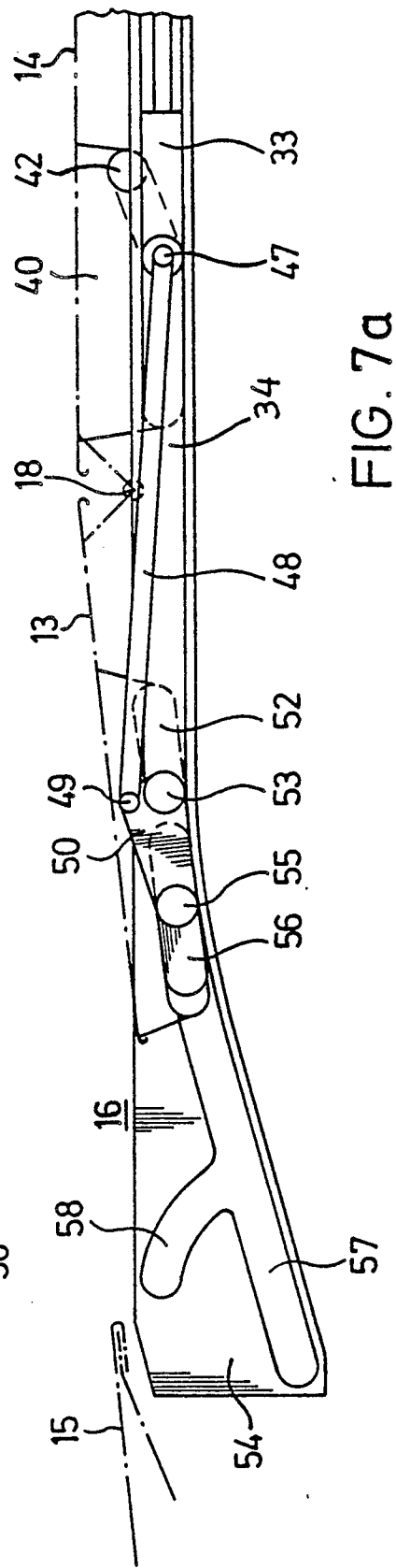
FIG. 6b
FIG. 7a

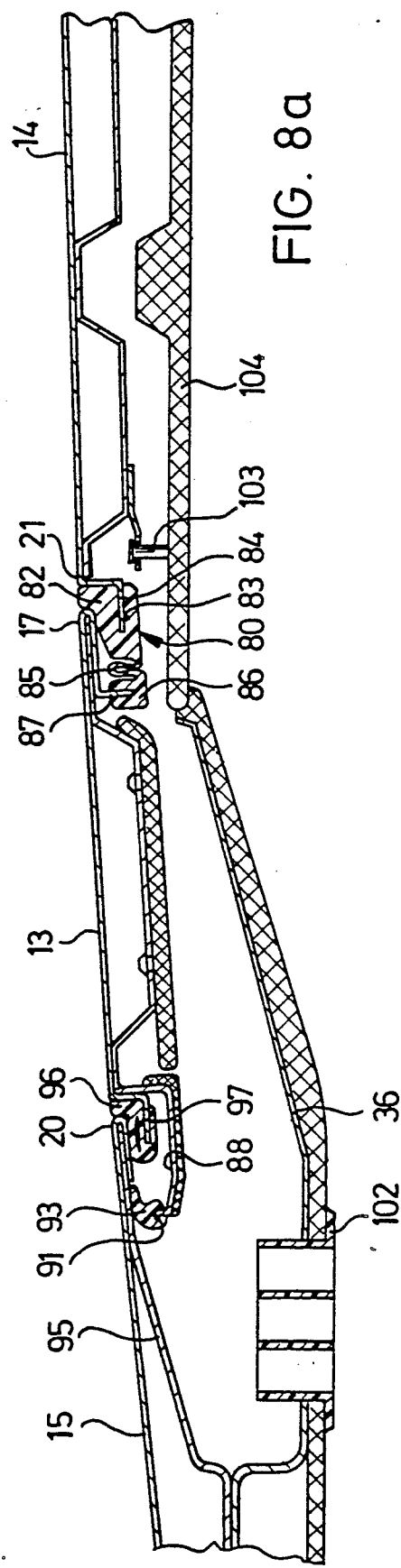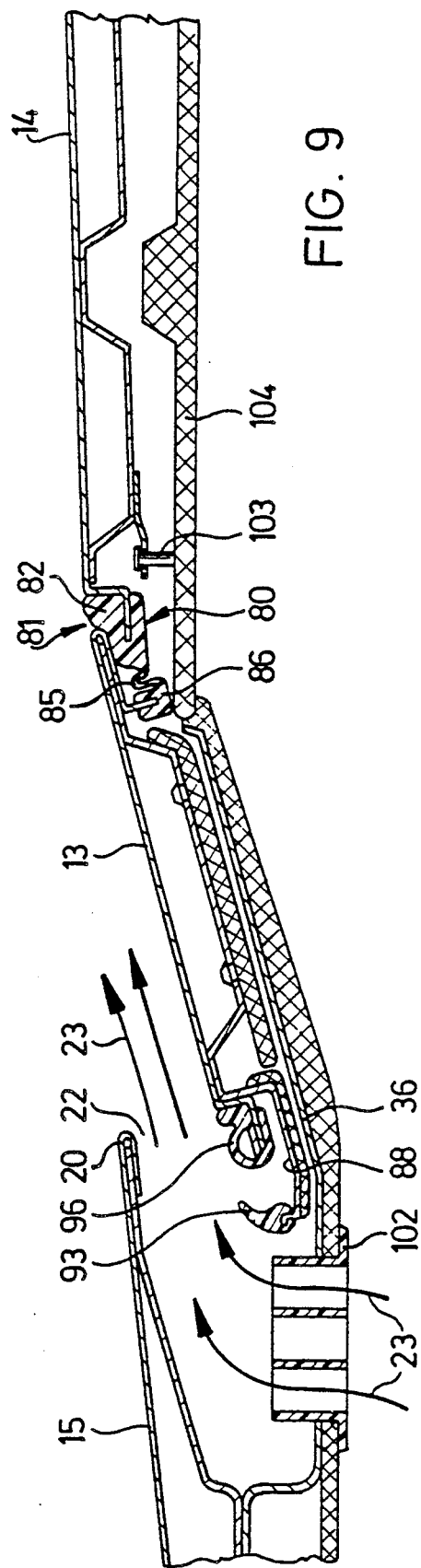

ns,771

VEHICLE ROOF WITH TWO-PART COVER

TECHNICAL FIELD

The present invention relates to a vehicle roof having a stationary roof panel with a roof opening fitted with a cover comprised of a front and a rear cover part that together, in a closed position, close the roof opening. Alternatively, the rear cover part can be slid rearward along lengthwise guide mechanisms running on both sides of the roof opening into an open position that at least partially opens the roof opening, or the front cover part can be pivoted into a ventilation position relative to the rear cover part that is in its front-most position and that terminates in the roof skin.

BACKGROUND OF THE INVENTION

In a vehicle roof that is known from German Offenlegungsschrift 35 22 781, a front cover part can be pivoted into a ventilation position about pivot points that are connected with the roof and lying a short distance behind the front edge of the front cover part. In the ventilation position, the rear edge of the front cover part is pushed upward relative to the stationary roof skin and to the rear cover part to form a ventilation gap lying above the roof surface between the rear edge of the front cover part and the front edge of the rear cover part. When the front cover part is pivoted upward into the ventilation position, the aerodynamic properties of the vehicle are negatively influenced, especially at high speeds.

Aerodynamically still more unfavorable are so-called spoiler roofs. One such device is described in German Offenlegungsschrift No. 33 11 452 which discloses a one-piece cover that, after being pivoted out into a ventilation position, can be pushed rearward above the stationary roof membrane.

Another type of ventilation roof, as described in U.S. Pat. No. 4,911,497 includes a roof opening made in a stationary roof skin which can be closed by a one-piece cover that is in active connection on both sides with a control mechanism comprised of front and rear height adjusting mechanisms. The one-piece cover can be pivoted from the closed position into a ventilation position by the front height adjusting mechanisms about a pivoting axis lying at or near the cover's rear edge. In this position, the cover's front edge lies under the plane formed by the roof skin, while the cover's rear edge is kept at least approximately at the height of the stationary roof skin. The cover can then be lowered into an open position by first using the rear height adjusting mechanisms so that its rear edge lies under the stationary roof skin. The lowered cover is then slid rearward under, and approximately parallel to, the stationary roof skin by a drive unit along longitudinal guide mechanisms integral with the roof into the open position in which the cover at least partially opens the roof opening. Such a roof design permits effective ventilation without impairing the aerodynamic properties of the vehicle, even at high speeds. However, in the case of low-lying vehicles, the cover's ventilation position can sometimes result in inadequate headroom.

Also known (U.S. Pat. No. 4,911,496) is a ventilation roof with a two-part cover in which the rear cover part is lowered at its front edge to create a ventilation gap between the rear end of the front cover part and the front edge of the rear cover part.

SUMMARY OF THE INVENTION

The present invention has the primary object of providing a vehicle roof of the type mentioned above that has especially favorable aerodynamic properties without resulting in inadequate headroom.

This object is achieved in accordance with the present invention for a vehicle roof having a cover comprised of a front and a rear cover part which, in a closed position, together close a roof opening made in the stationary roof skin. Alternatively, the rear cover part can be slid rearward along longitudinal guide mechanisms running on both sides of the roof opening into an open position that at least partially opens the roof opening. Also, the front cover part can be pivoted relative to the rear cover part, which is in its front final position in the roof membrane, into a ventilation position. The object is therefore achieved in that, in the ventilation position, the front edge of the front cover part is lowered under the stationary roof skin forming a ventilation gap lying in the area of the front edge of the roof opening while the rear edge of the front cover part is kept at least approximately at the height of the front edge of the rear cover part.

In the case of the vehicle roof according to the present invention, in all possible cover positions practically no cover parts project upward above the stationary roof skin. This guarantees an aerodynamically favorable travel behavior, especially at high speeds while considerably reducing disturbing wind noises compared to the previously known roofs. Making the ventilation gap in the area of the front edge of the roof opening is advantageous from a ventilation engineering viewpoint for deicing and removing condensation on the front windshield. Also, both driver and passenger are not bothered by the air current resulting from the cover in the ventilation position.

Another advantage of the present invention when in the ventilation position is that the rear cover part located above the head of the driver and passenger is not lowered, thus retaining full headroom while permitting the size of the ventilation gap to be dimensioned larger. Moreover, the wedge-shaped side gaps resulting from lowering the front cover part are limited to the front area of the cover, further contributing to a reduction of the wind noises. Also, the rear cover part remains in the same plane as the stationary roof membrane.

In a further development of the invention, the front cover part is coupled to the rear cover part so that it is linked to move with the rear cover part in its sliding movements in the longitudinal direction. This design permits both cover parts to be slid together under the portion of the roof skin adjacent to the rear edge of the roof opening. As a result, the aerodynamically favorable properties are retained while a large part of the roof opening is uncovered, giving the driver a feeling of traveling in a convertible.

Advantageously, both cover parts that are slidable in the longitudinal direction are hinged to one another in the area of their ends which face one another. A flexible sealing element extends over the entire width of the facing ends of the cover parts to form a water-tight seal between both cover parts in all cover positions. In this way, sealing problems at the contact point of both cover parts are effectively prevented. A further improvement in sealing the vehicle roof is provided by a seal surrounding the two-part cover's outer edge for engaging the under edge of the roof opening in the closed position.

To achieve a relatively simple, sturdy and reliable adjustment mechanism, the front cover part can be permanently connected to a drive, while the rear cover part is connected to the drive by a slack driving pivoted by the drive acts on both sides of the front area of the front cover part end lying away from the front cover part between the closed position and the ventilation position, prevents longitudinal sliding of the rear cover part relative to the roof opening. In this way, undesired shifts of the rear cover part are definitely avoided.

Preferably, a push-out lever acts on both sides of the rear area of the rear cover part while the lever's end lying away from the rear cover part is attached to a sliding carriage guided to slide along the associated longitudinal guide mechanism.

In another development of the invention, the slack driving coupling and the locking device have a common stopping block mounted for crosswise adjustment in the sliding carriage relative to its sliding direction. This design brings the sliding carriage, under the influence of the drive, alternately into detachable connection with a slider that is permanently connected to the drive and can be slid along the longitudinal guide mechanism or with a part integral with the roof.

The cover can be held especially secure in the rear area if the push-out lever assumes an approximately vertical position when the cover is in its front-most position.

The overall design of the present invention is further simplified and structurally stabilized if the push-out lever is connected to the cover, or to a part integral with the cover, by a pin which, when the rear edge of the rear cover part is lowered, engages in a guide track of the longitudinal guide mechanism.

The length of the front cover part is suitably between 10 and 30%, preferably about 20%, of the overall length of the combined length of the two cover parts of which the cover is formed.

These and further objects, features and advantages of the present invention will become more obvious from the following description when taken in connection with the accompanying drawings which show, for purposes of illustration only, a single embodiment in accordance with the present invention.

BRIEF DESCRIPTION OF THE DRAWINGS

FIGS. 4 is a top view of the left part of the vehicle roof with in the closed position;

FIG. 5a and 5b together show a longitudinal cross-section of the vehicle roof in the area of the adjustment mechanism in the FIG. 1 closed position;

FIGS. 6b and 6c are longitudinal cross-sections corresponding to FIGS. 5a and 5b in the FIG. 2 ventilation position;

FIGS. 7a and 7b are longitudinal cross-sections corresponding to FIGS. 5a and 5b when the cover is brought into the sliding position and is partially slid back;

FIGS. 8a and 8b are longitudinal cross-sections in the area of the cover parts in the FIG. 1 closed position;

FIG. 9 is a longitudinal cross-section corresponding to FIG. 8a in the FIG. 2 ventilation position;

DETAILED DESCRIPTION OF THE PREFERRED EMBODIMENT

Figure 1:
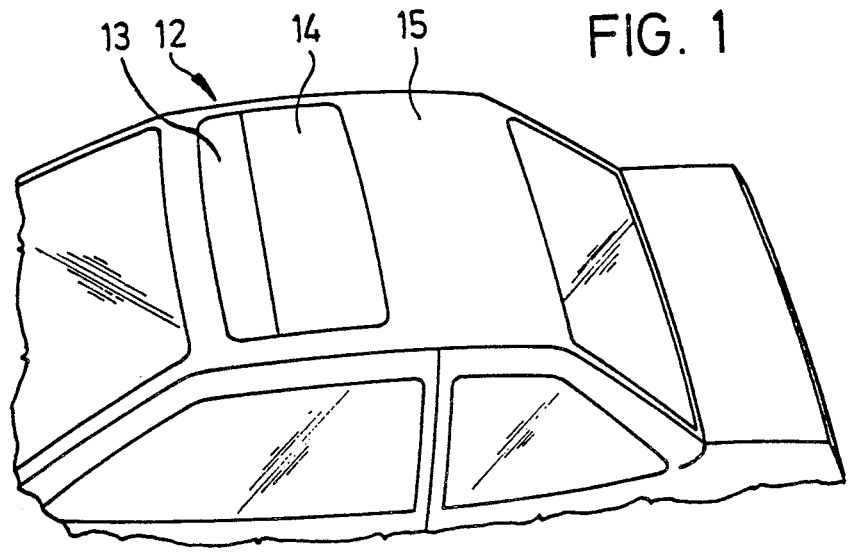
FIG. 1 is a perspective view of the vehicle roof of the present invention in the closed position.
Figure 2:
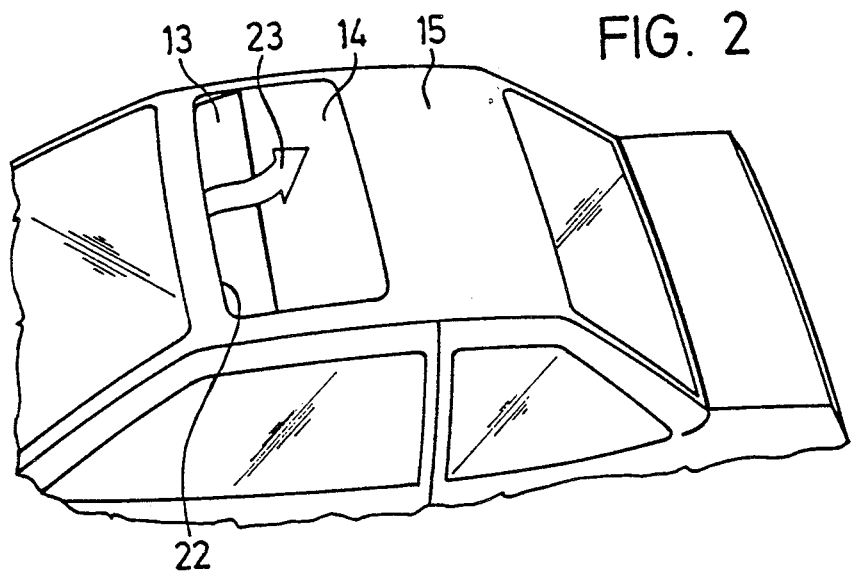
FIG. 2 is a perspective view of the vehicle roof of the present invention in the ventilation position.
Figure 3:
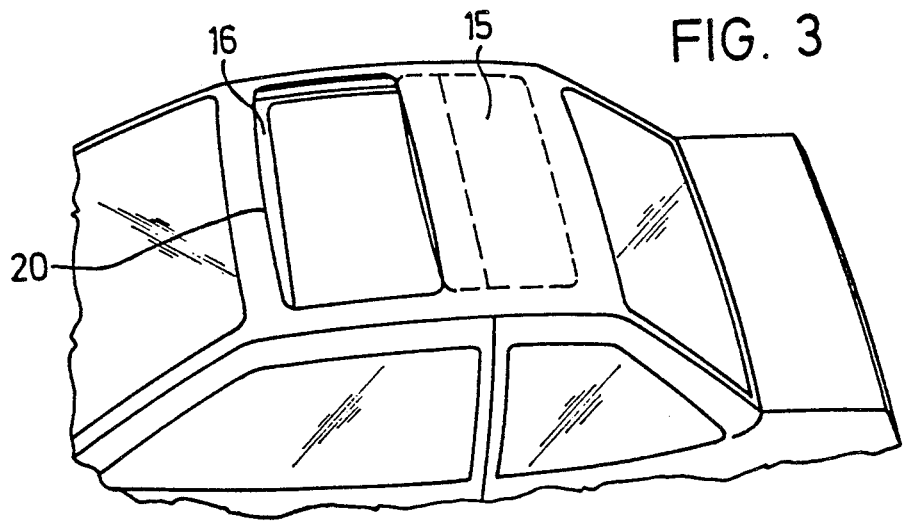
FIG. 3 is a perspective view of the vehicle roof of the present invention in the open position.
Figure 5A:
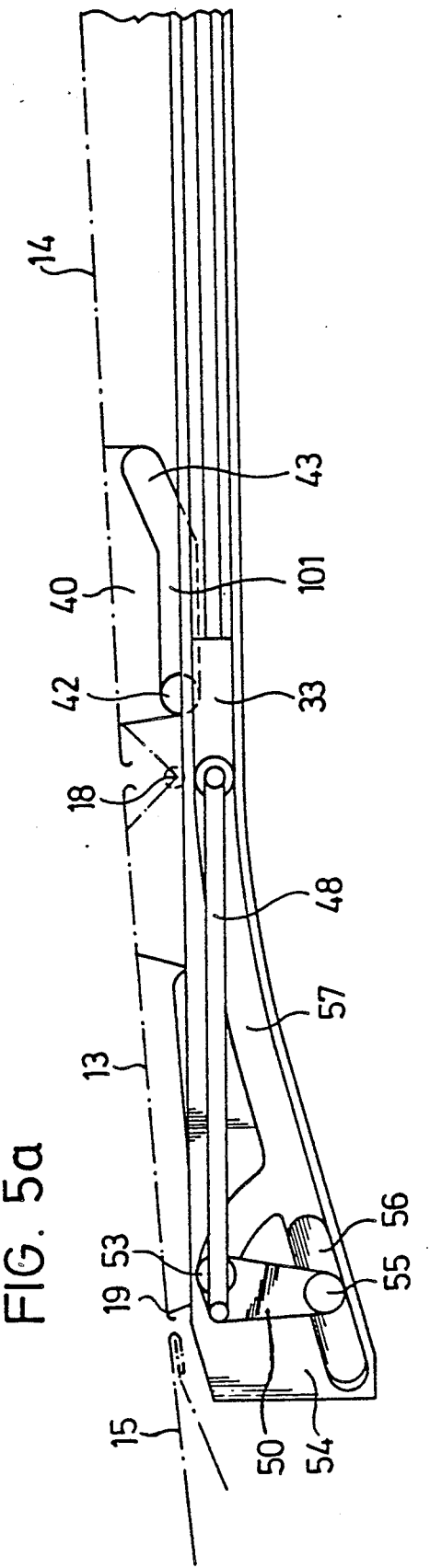

The vehicle roof shown in FIGS. 1 to 3 includes a cover 12 with a shorter front cover part 13 and a longer rear cover part 14. In a closed position, cover parts 13, 14 together close a roof opening 16 made in a stationary roof skin 15 of a vehicle (FIGS. 1, 5a and 5b). Cover parts 13 and 14 are hinged together in the area of their adjacent ends, i.e., those ends which face one another.

Figure 11:
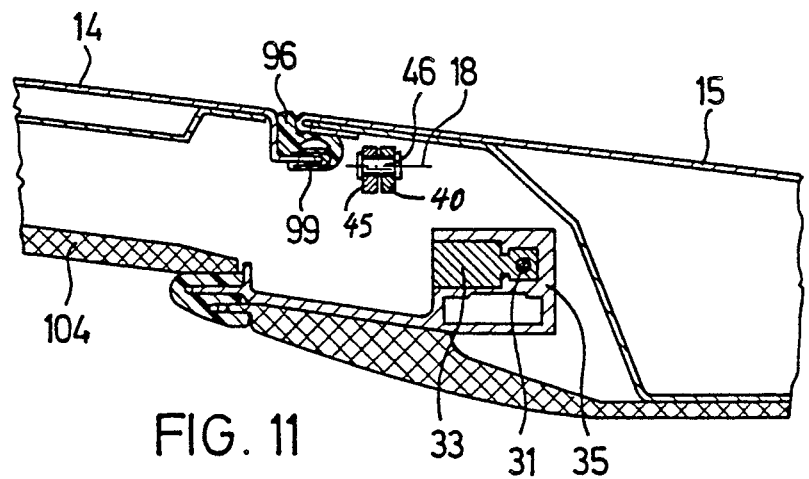
FIG. 11 is a partial cross-sectional view taken along line XI—XI of FIG. 4.

When rear cover part 14 is in a front-most position essentially flush with the fixed roof skin 15, front cover part 13 can be pivoted into a ventilation position around a horizontal pivot axis 18 that lies at or near the front cover's rear edge 17 and extends perpendicular to the vehicle's longitudinal axis as shown in FIGS. 4 and 11. In reaching the ventilation position, front edge 19 of front cover part 13 is lowered below front edge 20 of roof opening 16 below the stationary roof membrane 15 to form a ventilation gap 22 while rear edge 17 of the front cover part is kept at least approximately at the height of front edge 21 of rear cover part 14.

Referring to FIGS. 2, 6a, 6b and 9, if, during travel of the vehicle, a partial vacuum results on the outside of the stationary skin 15 relative to the pressure prevailing in the vehicle interior, movement of cover 12 into the ventilation position will allow a flow of air 23 to pass through ventilation gap 22, thus effectively ventilating the vehicle interior. As shown in FIG. 3, cover 12 can also be slid rearward as a whole into an open position uncovering at least a portion of roof opening 16. As illustrated, cover parts 13 and 14 are received in a space 24 rearwardly adjacent to roof opening 16 to the rear and under roof membrane 15.

Referring to FIG. 4, the adjustment mechanism of cover 12, explained in greater detail below, is constructed essentially in mirror-image symmetry to the longitudinal axis of symmetry 26. Consequently, the description of the design and manner of functioning of one roof side essentially coincides with the other side and, therefore, only one side will be discussed. The terms "front" and "rear" here, are used relative to the front and rear of the vehicle in which the roof is made.

Still referring to FIG. 4, to adjust cover 12, a drive 27 is provided that includes an electric motor 28 with a reduction gear 29 connected downstream of it. It is understood that other driving means than an electric motor may be used, for example, a hand crank drive. A drive pinion 30 of drive 27 is engaged in two threaded pressure-resistant drive cables 31 and 32. A drive sliding carriage 33 is connected to drive cable 31 while drive cable 32 is connected to a corresponding drive sliding carriage on the other side of the roof. Drive sliding carriage 33 is guided to slide along a guide track 34 of a longitudinal guide mechanism 35 which, in the embodiment represented, comprises a guide rail that is part of a frame 36 placed under stationary roof skin 15.

Figure 10:
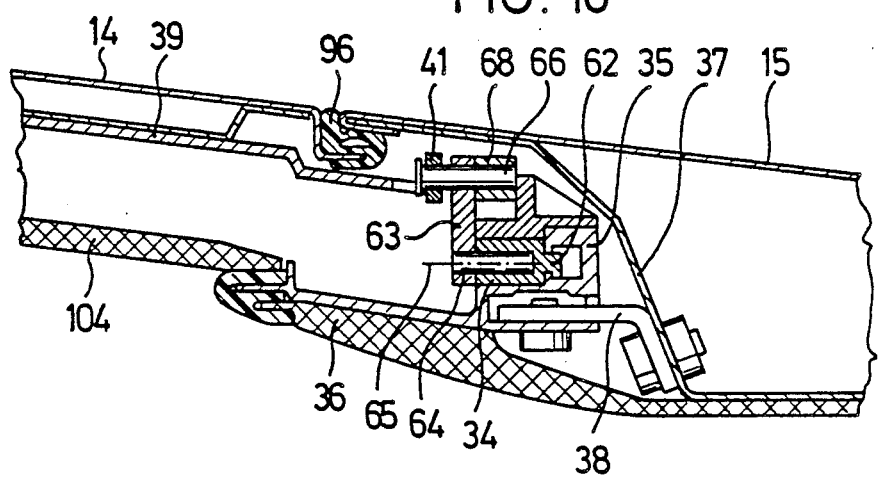
FIG. 10 is a partial cross-sectional view taken along line X—X of FIG. 4.

Frame 36 comprises guide rails, which are preferably metallic and positioned on both sides of roof opening 16, and a front and a rear cross strut 77 and 78. Cross struts 77, 78 may be made of plastic molded parts having water drains 79, or may be comprised of a one-piece plate or plastic frame having either integral guide tracks 34 or a separate mountable guide track components. Frame 36 is connected to reinforcing elements 37, which are integral with the roof, by attachment elements 38 (FIG. 10). As shown in FIGS. 4 and 10, a bent connecting plate 39 is rigidly connected to rear cover part 14 and projects laterally outward beyond rear cover part 14 to support essentially vertical front and rear connecting plate bars 40 and 41. A connecting pin 42 attached to drive sliding carriage 33 engages a link slot 43 in front connecting plate bar 40. A front connecting plate 44, laterally projecting outwardly beyond front cover part 13 is attached to the underside of front cover part 13. A vertical bar 45 extending from plate 44 is connected to bar 40 by a hinge pin 46 which, together with a corresponding hinge pin on the other side of the roof, defines the horizontal pivoting axis 18 (FIGS. 4 and 11).

Figure 6A:
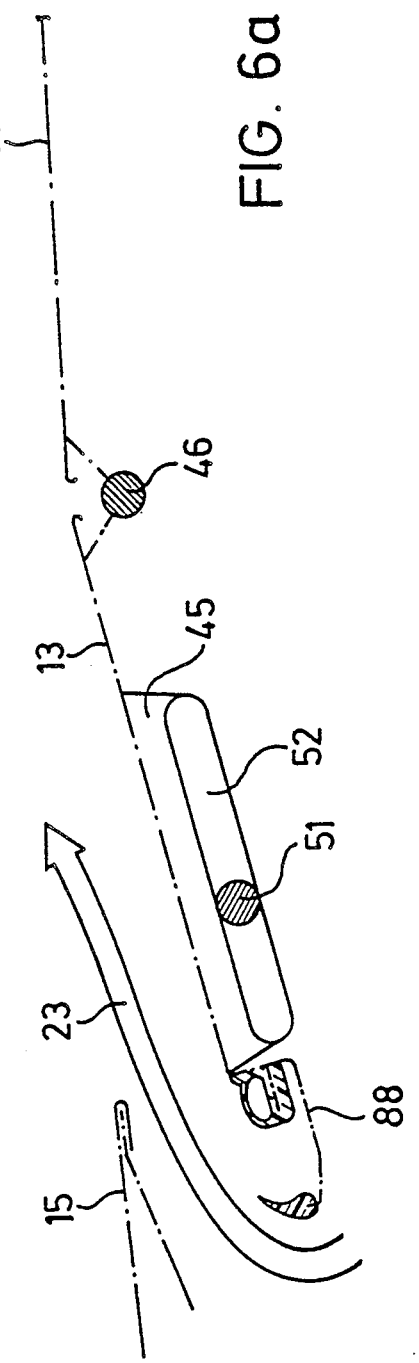
FIG. 6a is a diagrammatic cross-sectional depiction of the roof parts in the FIG. 2 ventilation position.

Referring to FIGS. 4, 6a and 7a, drive sliding carriage 33 is connected by a hinge 47 to the rear end of an adjusting lever 48 which is connected at its front end by a hinge 49 to a lowering lever 50. Lowering lever 50 carries a connecting pin 51 that points inward and is movably guided in a slot 52 of bar 45 of front connecting plate 44. A locking pin 53 extends outwardly from the outer side of lowering lever 50 to engage an insert part 54 that is integral with the roof and adjacent to longitudinal guide mechanism 35. The end of lowering lever 50 lying away from hinge 49 and locking pin 53 is connected by another hinge 55 to a front sliding carriage 56 that is movably guided along guide track 34 and a running track 57 of insert part 54. Running track 57 is inclined forward and downward starting from the front end of guide track 34. Insert part 54 also includes a locking link path 58 which branches upwardly in a forward-directed arc from running track 57.

Referring to FIGS. 4, 5b, 6c, 7b, and 10, drive sliding carriage 33 is rigidly connected by a connecting strip 60 to a slider 61 that is movably guided in guide track 34 of longitudinal guide mechanism 35. Behind slider 61, a rear sliding carriage 62 is movably guided in guide track 34. A push-out lever 63 is connected at one end to sliding carriage 62 by a hinge 64 that provides a pivoting movement around a horizontal axis 65 defined by hinge 64 and a corresponding hinge on the opposite side of the roof. At its other end, push-out lever 63 also includes a push-out pin 66 for making a hinge connection between push-out lever 63 and bar 41 of rear connecting plate 39. On the end of push-out pin 66 facing away from bar 41, a roller 68 pivotingly engages guide track 34 of longitudinal guide mechanism 35 or guide track 69 of an insert part 70 which is rigidly connected to longitudinal guide mechanism 35. Guide track 69 is formed as an extension of guide track 34 running forward and upward. An auxiliary push-out pin 67 attached to push-out lever 63 glides along a top side 71 of longitudinal guide mechanism 35 and of a cam track 72, of insert part 70. A stopping block 74 is guided in a passage 73 of rear sliding carriage 62 and is transversely adjustable in relation to the sliding direction of sliding carriage 62. Alternately, a lower end of stopping block 74 is inserted in a stopping block notch 75 of slider 61 or a top end of block 74 is inserted in a stopping block notch 76 of insert part 70.

As can be seen especially from FIGS. 8a and 9, both cover parts 13 and 14 are connected to one another by a flexible sealing element 80 which is positioned in an edge gap 81 between the facing ends of cover parts 13 and 14 over their entire width to provide a water-tight seal in all cover positions. Sealing element 80 includes a main body 82 having an essentially horizontal slot 83 for engaging on a projecting flange 84 of rear cover part 14 which is downwardly offset relative to the top side of rear cover part 14. Main body 82 is integrally connected by a corrugated intermediate part 85 to a front attachment strip 86. Attachment strip 86 attaches to a vertical flange 87 of front cover part 13, forward of the rear edge 17 of front cover 13.

Figure 8B:
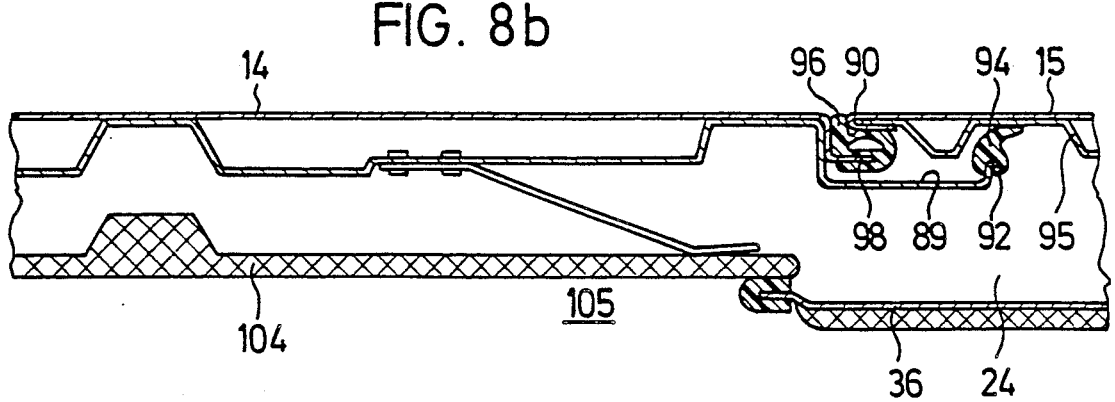

Two-part cover 12 carries a drip molding 88 at the front and 89 at the rear (see FIGS. 4, 8a and 8b). In the closed cover position, front drip molding 88 of front cover part 13 extends under front edge 20 of roof opening 16, while rear drip molding 89 of rear cover part 14 engages under rear edge 90 of the roof opening. Outer edge flanges 91 and 92 of drip moldings 88 and 89 carry a sealing strip 93 and 94, respectively. In the closed cover position, sealing strips 93, 94 lie against the underside of stationary roof skin 15 or a roof reinforcement part 95 attached to it. A surrounding seal 96 extends along the outer edge of two-part cover 12, on projecting edge flanges 97 and 98 of front cover part 13 and of rear cover part 14, respectively. These flanges 97, 98 are offset downward relative to the top side of the cover 12 so that the seal 96 is pressed by flanges 97, 98 against the edge of roof opening 16 in the closed position. As shown in FIG. 11, the seal 96 is equipped with a relatively stiff insert 99 in the form of an assembly strip of a generally U-shaped transverse cross-section. This connecting strip, or the like, lies at approximately the same height as pivot axis 18.

The roof described above operates as follows:

In the closed position according to FIGS. 1, 4, 5a, 5b 8a, 8b and 10, both cover parts 13, 14 assume their frontmost position, and their top sides run at least approximately flush with the top side of stationary roof skin 15. Sealing strips 93 and 94, as well as seal 96, are pressed from below against the stationary skin, because lowering lever 50 and push-out lever 63 assume their upright position while connecting pin 42 is on the front end of a front section 101 of link slot 43 running parallel to guide track 34, as shown in FIG. 5a.

To place the cover in the ventilation position from the closed cover position, drive motor 28 is actuated to move drive cable 31 and connected drive sliding carriage 33 rearward, causing connecting pin 42 to move in link slot 43 rearward until it reaches the position illustrated in FIG. 6b. The position of rear cover part 14 remains unchanged. Torque is exerted on lowering lever 50 by adjusting lever 48, causing locking pin 53 to move along locking link 58 toward running track 57 of front insert part 54. In this way, lowering lever 50 is pivoted clockwise around hinge 55 thereby moving connecting pin 51 in slot 52 and causing front cover part 13 pivot around pivot axis 18 of hinge pin 46 (see FIG. 6a). As a result, front edge 19 of cover part 13 is lowered, forming ventilation gap 22 while rear edge 17 of cover part 13 is kept essentially at the height of front edge 21 of rear cover part 14.

Ventilation gap 22 is formed on the front end of roof opening 16 between lowered cover front edge 19 and stationary roof skin 15. Air stream 23 can reach the outside from the vehicle interior through gap 22 and by a ventilation screen 102 (FIG. 9) or the like which is integral with the roof and preferably supported by front cross strut 77 of frame 36. A movable headliner 104 is connected to cover 12 by a front catch 103 and covers the frame opening 105, which is defined by frame 36 and lies under roof opening 16, in the closed position, ventilation position, and all intermediate positions between these two positions.

In any position between the closed and ventilation positions, stopping block 74 of rear sliding carriage 62 is engaged in stopping block notch 76 of rear insert part 70. In this way, a shifting of sliding carriage 62 and of push-out lever 63 is prevented.

As shown in FIGS. 6b, 7a, 7b, in moving the cover 12 from the closed or ventilation position to the open position, the drive sliding carriage 33 is moved further rearward, directing connecting pin 42 into an upward slanting, rear section 106 of link slot 43, thereby lowering the front edge 21 of rear cover part 14 below the plane of stationary roof skin 15. Further movement of drive sliding carriage 33 and connecting strip 60 causes slider 61 to move around until limit stop 107 of slider 61 is positioned against the front end of rear sliding carriage 62 as shown in FIG. 6c. Engagement of stopping block 74 with a slanted surface 108 of stopping block notch 76 exerts a downward-oriented force component on stopping block 74 causing stopping block 74 to move from stopping block notch 76 into stopping block notch 75 of slider 61. Thereby rear sliding carriage 62 is coupled to slider 61 and thus to drive sliding carriage 33 and to drive cable 31.

Continued movement of slider 61 slides carriage 62 rearward, causing push-out lever 63 to pivot counterclockwise by the interaction of pins 66 and 67 with guide track 69, or with cam track 72 around axis 65, as shown in FIG. 6c. In doing so, the rear portion of cover part 14 is lowered by push-out pin 66. Further movement of drive sliding carriage 33 to the rear also causes cover parts 13 and 14 to be carried rearward under stationary roof skin 15. In doing so, locking pin 53 and front sliding carriage 56 move first along rearwardly rising running track 57 of front insert part 54, then into guide track 34 of lengthwise guide mechanism 35. The fully open position is obtained when cover 12 is pushed as a whole into space 24 to the rear of roof opening 16 and cover headliner 104 is removed from frame opening 105.

As the cover is closed, the drive sliding carriage 33 is moved forward, resulting in the movement operations explained above run correspondingly in reverse. As shown in FIG. 7b, when auxiliary push-out pin 67 strikes cam track 72, push-out lever 63 is pivoted clockwise, causing push-out pin 66 to go from guide track 34 into guide track 69. Push-out lever 63 is brought into the upright position illustrated in FIGS. 5b and 5c in which it strikes a stop 109 or rear insert part 70. An upwardly oriented force component is exerted on stopping block 74 by a slanted surface 110 of stopping block notch 75. Stopping block 74 exits stopping block notch 75 and is inserted again in stopping block notch 76. The forward movement of connecting pin 42 along section 106 of link slot 43 raises front edge 21 of rear cover part 14 (FIG. 6b). Finally, front cover part 13 is pivoted into the closed position (FIG. 5a) by adjusting lever 48 and lowering lever 50.

While we have shown and described a single embodiment in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. A vehicle roof having a stationary roof skin with a roof opening therein, and a movable cover for closing said roof opening in a closed position, said cover having a front and a rear cover part; wherein a longitudinal guide mechanism is provided on each side of said roof opening, the rear cover part being slidably guidable by said roof guide mechanism into an open position in which said roof opening is at least partially uncovered; and comprising a means for pivoting said front cover part into a ventilation position in which it is pivoted relative to said rear cover part and said rear cover part is kept in said closed position by lowering a front edge of said front cover part a distance below said stationary roof skin in a manner creating a ventilation gap between said front edge of said front cover part and a front edge of said roof opening while maintaining a rear edge of said front cover part at least approximately even with a front edge of said rear cover part.

2. The vehicle roof of claim 1, wherein said front cover part is coupled to said rear cover part in a manner causing said front cover part to move with said rear cover part in the vehicle longitudinal direction.

3. The vehicle roof of claim 2, wherein the coupling of said front cover part and said rear cover part comprises a hinge in an area of facing ends thereof.

4. The vehicle roof of claim 3, wherein said front cover part and said rear cover part are connected to one another by a flexible sealing element positioned in the area of said facing ends along the entire width of said front cover part and said rear cover part.

5. The vehicle roof of claim 4, wherein said sealing element provides a water-tight seal in an edge gap located between said front cover part and said rear cover part in all cover positions.

6. The vehicle roof of claim 5, wherein said sealing element covers said edge gap and engages under at least one of the facing ends of the cover part.

7. The vehicle roof of claim 1, wherein said cover is slidably located under a portion of said roof skin which rearwardly borders said roof opening.

8. The vehicle roof of claim 1, wherein a surrounding seal which engages under the edge of said roof opening in said closed position is carried by an outer edge of the cover.

9. The vehicle roof of claim 8, wherein said surrounding seal includes a relatively stiff insert, and wherein said front cover part pivots around a pivot axis which is located at approximately the same height as said insert.

10. The vehicle roof of claim 8, wherein said cover carries a drip molding on its front and rear edges for engaging under front edge and rear edges of said roof opening in said closed cover position.

11. The vehicle roof of claim 1, wherein said front cover part is permanently connected to a drive device while the rear cover part is connected to said drive device by a disengagable driving coupling.

12. The vehicle roof of claim 11, wherein said drive device comprises a means for pivoting a lowering lever which acts on both sides of said front cover part, and wherein said lowering lever has an end lying away from said front cover part which is connected to a longitudinal sliding carriage.

13. The vehicle roof of claim 12, wherein said sliding carriage is longitudinally slidable along a track that has a front section which is inclined downwardly toward the front of said vehicle.

14. The vehicle roof of claim 13, wherein said disengagable driving coupling includes a locking device that secures said rear cover part in said closed cover position and prevents said front cover part from longitudinal movement relative to said roof opening during pivoting movements of said front cover part between said closed position and said ventilation position.

15. The vehicle roof of claim 14, wherein a push-out lever acts on a rear area on both sides of the rear cover part, said lever having an end lying away from said rear cover part which is connected to a sliding carriage that is slidably guided along the longitudinal guide mechanism.

16. The vehicle roof of claim 15, wherein said locking device includes a stopping block mounted in said sliding carriage for movement transverse to the sliding direction of the sliding carriage, said drive device being operable for bringing said sliding carriage into detachable positive connection with a slider that is permanently connected to said drive device and capable of sliding along said longitudinal guide mechanism.

17. The vehicle roof of claim 15 wherein said push-out lever is constructed and arranged to assume an at least approximately vertical position while said cover is in said closed position.

18. The vehicle roof of claim 15, wherein said push-out lever is connected to said cover by a pin that is engaged in a guide track of said longitudinal guide mechanism when a rear edge of said covered part is lowered.

19. The vehicle roof of claim 15 wherein said push-out lever includes a catch that is positioned against a cam track, which is connected with said stationary roof skin, when said rear cover part moves forward as a means for forcing said push-out lever to pivot.

20. The vehicle roof of claim 7, wherein the length of said front cover part is between 10 and 30% of the total length of said cover.

* * * * *